United States Patent Office 2,711,816
Patented June 28, 1955

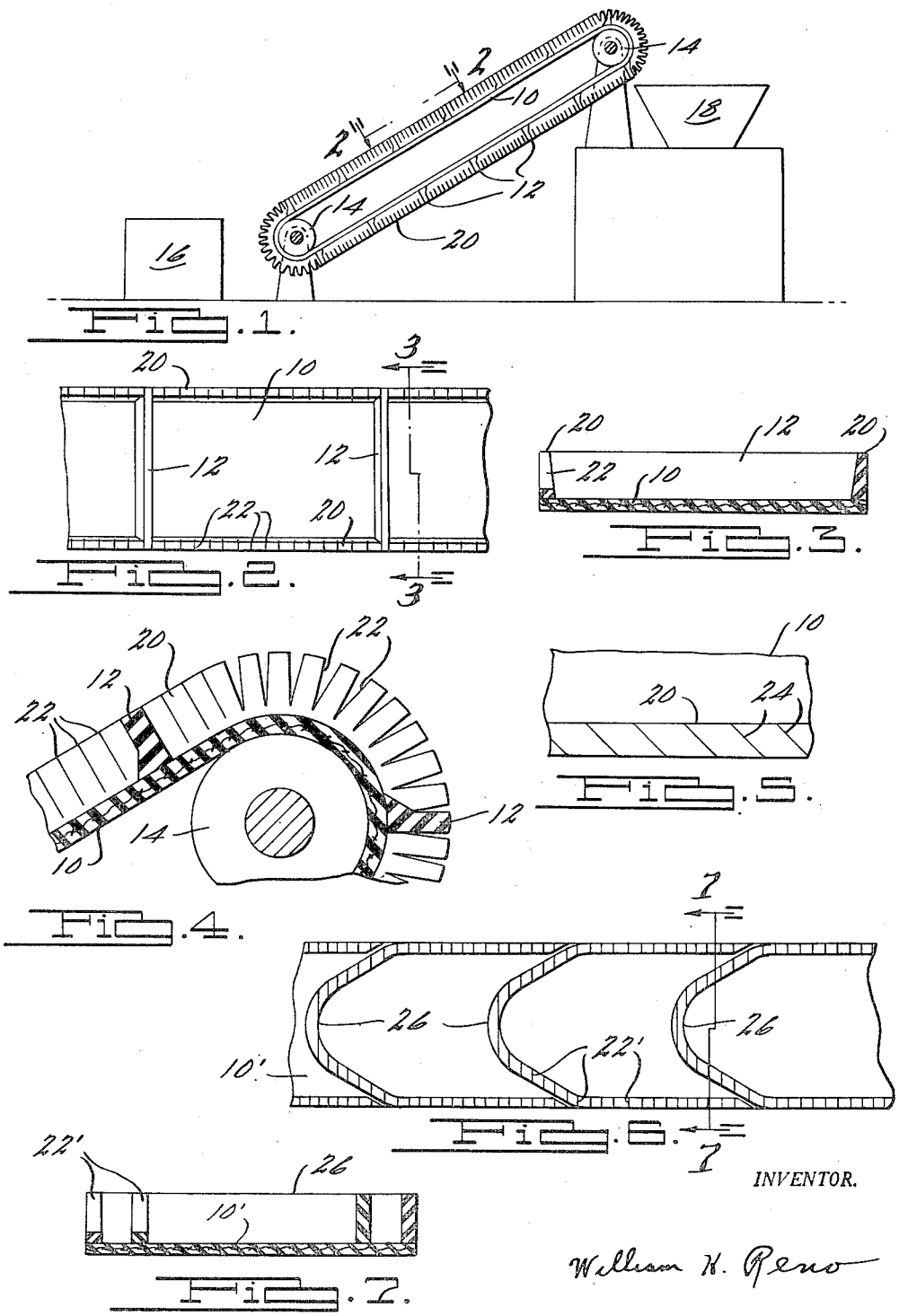

2,711,816
TROUGHED CONVEYER BELT

William H. Reno, Detroit, Mich., assignor to F. B. Wright Company, Detroit, Mich., a corporation of Michigan Application July 8, 1952, Serial No. 297,611

1 Claim. (Cl. 198—201)

This invention relates to the construction of flexible conveyer belts used in transporting miscellaneous shaped semi-finished machine parts around a fabricating shop from one machine to another.

More specifically my invention pertains to the construction of a conveyer belt having high side walls and transverse cleats to form a continuous open top box like structure to more efficiently move irregular sized machine parts up or down steep inclines and pass around small sized driving pulleys without excessive wear or flexing of the belt or loss of the material being transported.

Other advantages of my improved conveyer belt will be more fully described in the following specification and appended claims supplemented by a sheet of drawings of which:

Fig. 1 is a side elevation of my improved conveyer belt travelling from left to right and somewhat vertically between two stations or machines;

Fig. 2 is a fragmentary plan view of part of the belt shown in Fig. 1, indicated by and viewed in the direction of the arrows at 2—2 of Fig. 1;

Fig. 3 is a transverse sectional view of my improved belt taken on the line 3—3 of Fig. 2 and viewed in the direction indicated by the arrows;

Fig. 4 is a fragmentary view partly in section showing the action of the edge of the belt as it rolls around a pulley;

Fig. 5 is a fragmentary view of a modified form of the edge of the belt shown in Fig. 2;

Fig. 6 is a plan view similar to Fig. 2 showing another modified form of my invention; and Fig. 7 is a transverse sectional view of the belt shown in Fig. 6 and indicated by the lines 7—7 of Fig. 6.

In the drawings I have shown a conveyer system comprising a flexible rubber and fabric base belt 10 having transverse cleats 12 of rubber-like material molded or cemented to the upper surface thereof. This belt operates over any suitable pulley system 14 and is driven by it by mechanism not shown.

Material worked on at a station or machine 16 is placed on the belt and conveyed to a machine or station 18 to have further work performed thereon.

Between each of the transverse cleats 12 on each edge of the belt 10 I have cemented or molded a rubber-like edge 20 of substantially the same height as the cleats 12. Each of these edge pieces 20 is cut transversely at regular intervals from the top almost to the base or belt 10 as shown at 22. In Fig. 5 I have shown a fragmentary plan view to illustrate a modified form of the edge piece 20 wherein the cuts instead of being cut transversely are cut on an oblique angle as shown at 24 which presents an advantage which I will more fully explain later in the specification.

In the form of my invention shown in Figs. 6 and 7 I propose to make a substantially U-shaped cleat 26 which may be cemented or molded on to the surface of a belt 10'. The U-shaped cleats 26 are in overlapping relation to each other that is the sides of one extend beyond the base of the next successive cleat. Although I have shown the cleats 26 cut at 22' from the top almost to the belt 10' transversely across the belt it may be advantageous to cut the cleats 26 obliquely as suggested at 24 in Fig. 5.

It will be apparent that material that has been worked on at station 16 when placed on the belt 10 to be transported to station 18 will be surrounded by the cleats 12 and edges 20 and likewise in Fig. 6 be surrounded by the cleats 26 of the belt 10' and thereby prevented from rolling off the belt during movement from one place to another.

The belt 10 and cleats 12 readily flex or bend around the driving pulley 14 and it is apparent, as shown in Fig. 4, that the cuts 22 in the thick edge pieces 20 of the belt 10 will open up in V-shaped openings and allow the stiff edge portions 20 to also easily flex and bend around the pulley 14 and thereby reduce strain on the edges of the belt 10.

The cuts 22' of the cleats 26 of the belt 10' in Fig. 6 will open up in a V formation as that belt rolls around a pulley and allow free movement of that form of my invention without undue strain being placed upon the edges of the belt 10' or the cleats 26. The advantage of the oblique cuts 24 of the edge 20 as shown in Fig. 5 is that although the cuts 24 will open up in a V formation and allow the belt to freely bend around a pulley the V-shaped openings will be in an overlapping relation and the edge 20 will present an unnotched barrier at the sides of the belt and prevent small parts from falling thru the sides 20 as the belt rolls around the end pulleys 14.

Although I have shown but three forms of my invention it is to be understood that I do not wish to limit it other than by the scope of the appended claim.

I claim:

In a device of the class described, a material handling belt, adapted to perform its conveying function between two levels of different machines, a series of nested U-shaped cleats in overlapping relation with respect to each other secured to one surface thereof and regularly spaced slits in said U-shaped cleats at an oblique angle to the sides thereof, the angle of said slits being such that when the belt is flexed the sides thereof will always present an unserrated barrier.

References Cited in the file of this patent
UNITED STATES PATENTS

| 423,906 | Conkling | Mar. 25, 1890 |
| 993,418 | Smith | May 30, 1911 |
| 1,899,766 | McWilliams | Feb. 28, 1933 |
| 2,264,332 | Peterson | Dec. 2, 1941 |

FOREIGN PATENTS

| 812,622 | France | Feb. 8, 1937 |